Sept. 18, 1956  D. C. PEARL  2,763,743
TIRE FEELER SWITCH AND ALARM CIRCUIT
Filed June 4, 1954  2 Sheets-Sheet 1
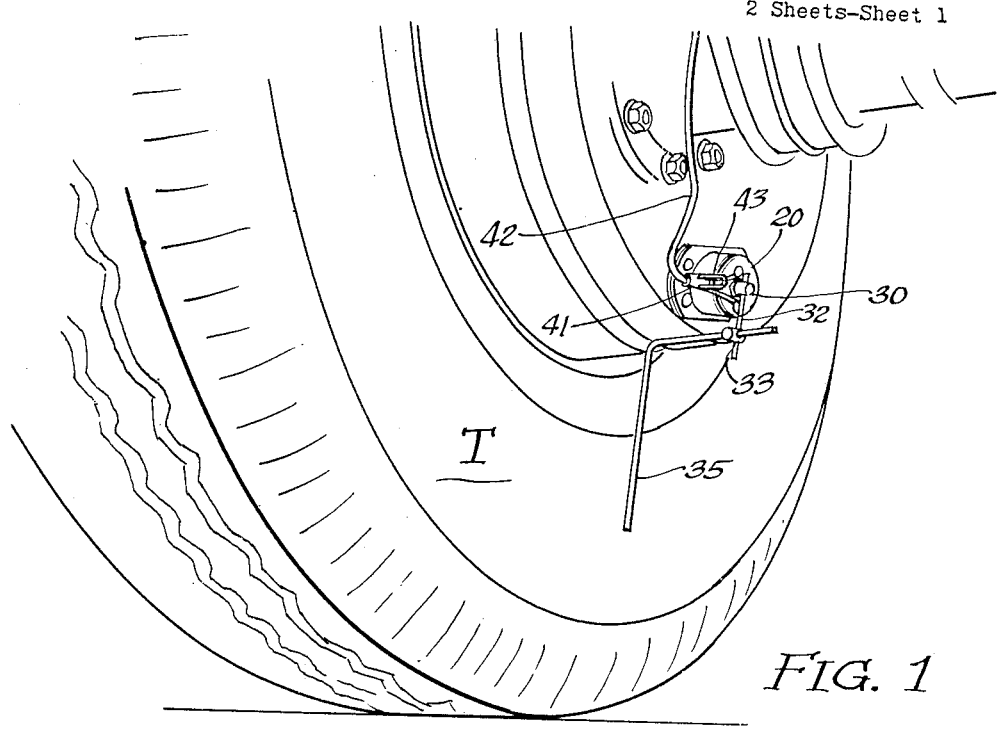
FIG. 1
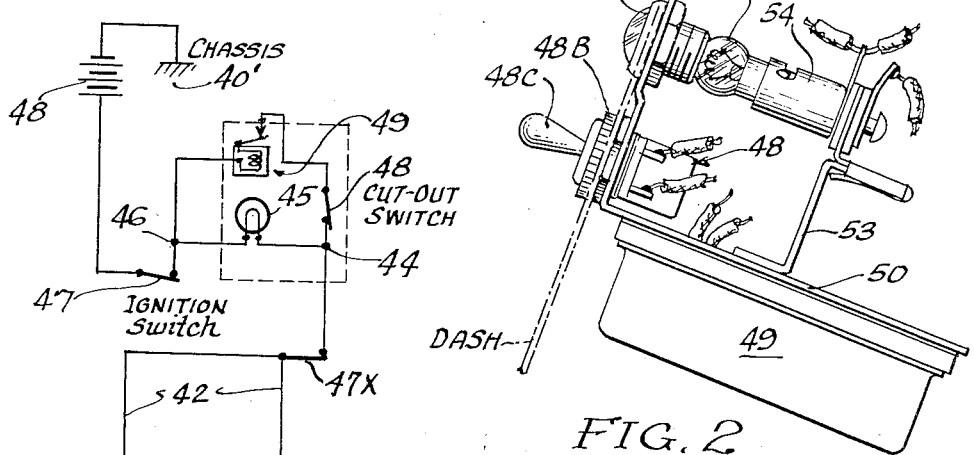
FIG. 3
FIG. 2
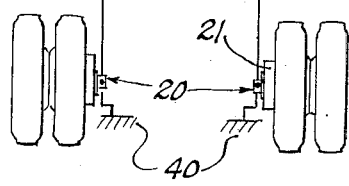
INVENTOR.
Donald C. Pearl
BY
Att'y Sept. 18, 1956        D. C. PEARL        2,763,743
TIRE FEELER SWITCH AND ALARM CIRCUIT
Filed June 4, 1954        2 Sheets-Sheet 2
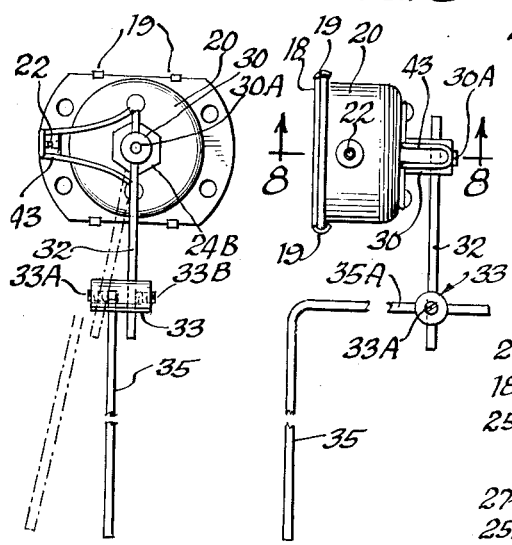
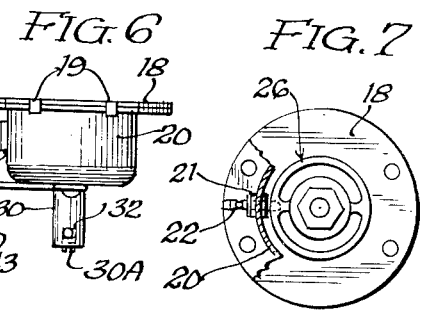
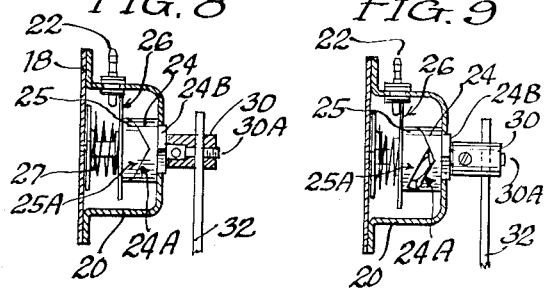
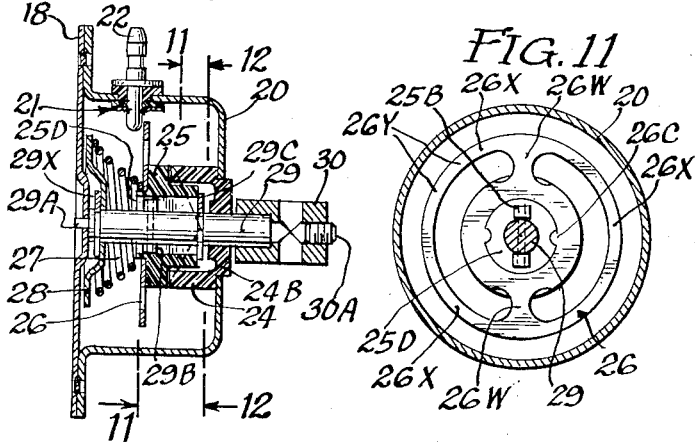
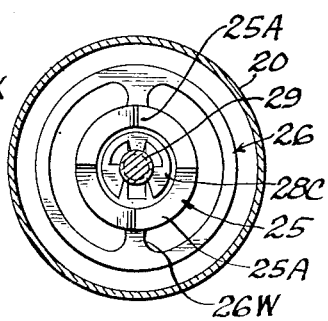
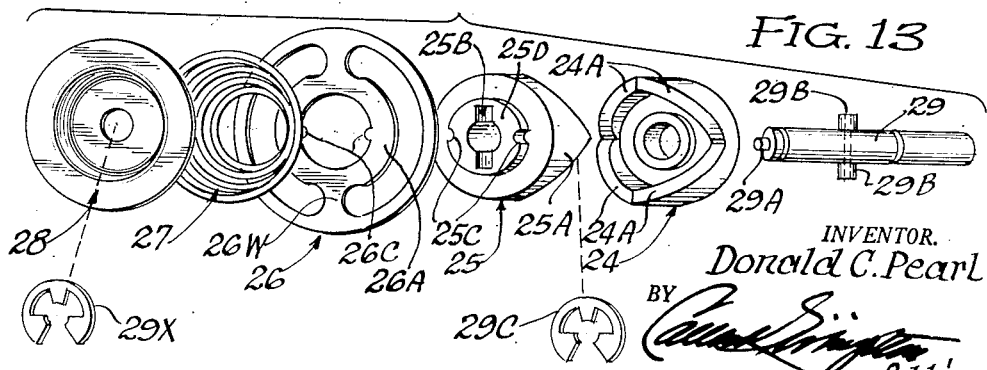
INVENTOR.
Donald C. Pearl
BY
Att'y

United States Patent Office 2,763,743
Patented Sept. 18, 1956

2,763,743

TIRE FEELER SWITCH AND ALARM CIRCUIT

Donald C. Pearl, Lake Zurich, Ill., assignor to Raymond T. Moloney, Chicago, Ill.

Application June 4, 1954, Serial No. 434,473

5 Claims. (Cl. 200—61.23)

This invention pertains to pneumatic tire alarms for automotive vehicles and has as its principal object the provision of a device of this class including a compact dashboard attachment with visual and audible alarm means, as well as an improved alarm switch structure and tire feeler means for actuating the same.

More detailed objects relate to the provision, in a device of the class described, of a torque switch including cam means for producing compound axial and angular movement of a contact spider with good wiping contact and pressure while the yieldability of the spider progressively relieves the pressure from the axial component of the compound movement thereof to assure good contact without damage to the movable contact.

Additional objects and aspects of novelty and utility relate to details of the construction, operation, and circuit means of the embodiment described hereinafter in view of the annexed drawings in which:

Fig. 1 is a fragmentary perspective view of a truck wheel equipped with one of the novel alarm switch units;

Fig. 2 is a circuit diagram for a two-wheel alarm system;

Fig. 3 is a side elevation of the dashboard signal and control unit;

Fig. 4 is a front elevation of one of the switch and feeler units;

Fig. 5 is a side elevation of the device of Fig. 4;

Fig. 6 is a top plan view of the device of Fig. 5;

Fig. 7 is an interior elevational detail with the housing shell removed and parts shown in section;

Fig. 8 is a longitudinal cross-sectional operating detail looking along lines 8—8 of Fig. 5, showing certain parts in elevation and in normal condition;

Fig. 9 is a view similar to Fig. 8 but showing switch and cam parts in operated condition;

Fig. 10 is an enlarged vertical longitudinal cross-section similar to Figs. 8 and 9 but including a detailed section through the torque cams;

Fig. 11 is a sectional detail taken along lines 11—11 of Fig. 10 with parts shown in elevation;

Fig. 12 is a cross-sectional detail taken along lines 12—12 of Fig. 10 with parts shown in elevation;

Fig. 13 is an exploded perspective of the torque-cam and switch-contact assembly.

Referring to Fig. 1, a typical installation as made on a four-wheel truck would include at least two, and usually four, of the switch and feeler units 20, each attached to the inside face of one of the brake housing shells 21 by bolts 22 threaded into suitable holes drilled into the shells for the purpose.

Projecting from the switch unit housing is a torque shaft 29 from the outside hub 30 of which depends a short feeler-arm section 32 having a coupling 33 affixed to its lower extremity and from which projects a longer, offset feeler rod section 35 (see also Fig. 5), the lower portion of which is situated approximately opposite the inwardly-facing sidewall of the appertaining wheel tire T at about the mid-region thereof.

When the tire deflates a significant amount it will bulge sidewise sufficiently to press against the feeler 35 and swing the latter, when in motion, pendulum-fashion in the direction of its rotation (e. g. Fig. 4), turning the torque shaft and actuating certain switch mechanism to be described, which in turn controls a dashboard signal unit such as shown in Fig. 2.

The construction of the individual wheel-switch units 20 is quickly ascertained from Fig. 10, wherein it will appear that said unit consists of a base plate 18, upon which is positioned the housing 20 secured thereto by crimped base lugs 19.

Secured in the upper sidewall of the housing shell is an insulating sleeve 21 through which projects a contact pin 22 having its lower end depending into the housing for purposes to appear.

Apart from the aforesaid contact pin 22, the entire switch mechanism is assembled on a stub shaft 29 having a reduced end spindle 29A seating in a bearing hole punched into the base plate, the opposite end portion of this shaft freely passing through a molded plastic bearing and cam piece 24 having a hexagonal shoulder 24A formed at its outer end to fit into a hexagonal punching in the dome of the housing shell 20 (as in Figs. 4 and 10), whereby this cam piece 24 is held stationary when the stub shaft is turned, yet the shell can be easily backed off the hexagonal shoulder portion in dismantling the unit. A clip washer 29B holds the cam element 24 on the shaft (Fig. 10).

Fitted onto the stub shaft is a complementary cam member 25 (Fig. 13 also), the cam profile projections 25A of which interfit with like formations 24A, there being a molded transverse keying formation 25B in this second cam member into which fits a transverse key pin 29B by which the second cam member is intercoupled with the stub shaft to turn with the latter against the relatively stationary cam piece 24, which will be held against turning by the hexagonal shoulder formation keyed into the shell, as heretofore mentioned, in the hexagonal keying punching.

Next in the switch assembly is a spring contact spider 26 (Figs. 10 and 13), having an annular hub portion 26A on the inner periphery of which are radial lugs 26C fitting into radial recesses 25C in a shoulder 25D on the second cam member, so that the contact spider is obliged to turn with the latter.

The switch assembly is completed by insertion of a conical presser spring 27 between the spider at one end and a spring-seating boss plate 26, the latter being pressed against base plate 18 by the spring 27, which likewise urges the contact spider and its associated cam piece 25 toward the right in Fig. 10 to maintain the latter in driving interfit with the first cam piece 24, and at the same time forcing the hexagonal shoulder on the latter cam into its seat in the housing dome, with the contact spider 26 spaced away from the stationary contact pin 22 in open-circuit condition, as illustrated in Fig. 10.

Referring to Fig. 10, it will be apparent that if a turning force be applied to the hub part 30, stub shaft 29 will turn, and with it the second cam member 25, owing to the keying action of the transverse shaft pin 29B in the molded transverse keyway 25B; and because of the axially-projecting profile cam formations 24A—25A and the immobility of the cam 24 due to its hexagonal-shoulder interlock with the housing shell, the second cam 25 must shift axially inward, from the normal, open-circuit condition depicted in Figs. 8 and 10, toward the left into the circuit-closing condition shown in Fig. 9, in which the contact spider 26 will be caused to press against the pendant contact pin 22, whereby the latter will be grounded through the housing shell and the brake housing to actuate the alarm means, as will be described.

When the turning effort responsible for the aforesaid camming action is withdrawn, the effort of spring 27 and the interaction of the axial cam projections 24A—25A will restore the shaft to normal position with the feeler arm 35 turned back from the dotted-line to full-line position of Fig. 4.

Because the cam rises are symmetrical on opposite sides of the axis or 180° apart, it is possible to turn the shaft into two successive positions in either direction, and this is advantageous in order to throw the feeler arm out of the way (upwardly) for attention to the tire or wheel, and in cases where an obstruction is encountered on the road which might otherwise damage the feeler.

As viewed especially in Fig. 11, the construction and operation of the contact spider is of importance, it being observed that the main contact portions 26X are connected to the annular hub part only by two narrow and diametrically opposite radial webs 26W, by reason of which the outer contact ring portion 26X is rendered increasingly yieldable in the angular directions away from the attaching webs 26W.

The switch is properly installed when the contact spider is set in the relative conditions shown in Figs. 7, 10, and 11 with the attaching webs 26W in vertical alignment with the stationary contact pin 22, so that when the spider first begins its compound axial and turning movement toward the contact pin 22, the regions of the contact ring 26X near the webs 26W will approach the pin first, but as the shaft 29 continues to turn the more yieldable regions of the contact ring, as at 26Y, finally engage the contact pin and the yieldable span 26Y offers decreasing resistance to the turning moment while maintaining good wiping contact with the pin, it being characteristic of the type of feeler action involved that the turning effort on the feeler arm 35 tends to fall off rapidly as it swings into the wider limit of its arc of travel with the deflated tire bulge. This provision makes for an optimum and reliable circuit-closing action of the switch contacts for the duration of the swing of the feeler arm.

There will normally be at least two, and preferably four, of the switch units in each alarm installation, it being recalled that the contact spiders in such units are grounded to the vehicle frame through the housing shells and brake housings, thus establishing a connection to one side of the alarm circuit, as at 40 in Fig. 3.

The remaining circuit connections from the stationary contact pins 22 are effected by conductors 42 each having a coupling socket connection 41 (Fig. 1), by which they are removably connected with their respective pins, there being on each switch housing a formed wire tie-bracket 43 (Figs. 1 and 4 to 6), to which the appertaining end of the conductor 42 is anchored to relieve stress from the connection at pin 22.

The alarm circuit is completed in the circuit diagram of Fig. 3 via conductors 42 to terminal 44, to which is connected one side of a signal lamp 45 having its remaining side connecting to terminal 46 of a master switch, such as the vehicle's ignition switch, the contact 47 of which is connected by conductor 48 to one side of battery 48 grounded to the chassis as at 40¹. Thus operation of either of the tire switches 20 will complete the circuit to ground for the lamp 45 provided the master switch means 47—46 is closed.

Shunted in parallel with the visual signaling means or lamp 45 is an audible signal device in the form of a buzzer 49, this connection being effected through a cut-out switch 51 in series with the buzzer so that the driver may cut out the audible signal if desired, but may not cut out the visual signal, except by operating the master switch, which should be the ignition switch for reasons of safety, it being the intention to oblige a stopping of the vehicle before the alarm can be wholly cut off, and to warn the driver at once upon turning on the ignition switch in case a flat should develop while the vehicle has been standing.

The compact alarm unit, as shown in Fig. 2, consists of a main bracket plate 50 to which the buzzer 49 is attached, one end of this bracket being upset at 51 to provide a vertical leg adapted to fit against the inside of the dashboard indicated in dotted lines at 52.

The cut-out switch 48 has a threaded nipple 48A which is adapted to project through one of two holes to be cut in the dash panel, the other hole being in alignment with the signal lamp. A nut 48B on the nipple retains the bracket and alarm assembly in operative attachment to the rear of the dash panel with the switch-operating handle 48C accessible on the face of the latter.

A master cut-out switch 47X (Fig. 3 only) may be employed in addition to the ignition switch if desired.

A small lamp bracket 53 is attached to the plate 50 and removably supports a socket 54 for lamp 45 with the latter in alignment with a colored jewel bezel 55 carried on the offset 51 in alignment with one of the two holes to be cut in the dash panel as aforesaid.

The operation of the alarm is such that the sidewalls of the tires normally clear the pendant feeler arms 35 when properly inflated; but upon deflating sufficiently, so that the tire flattens and bulges sidewise somewhat in the well-known manner, there will no longer be any clearance between the bulged tire wall and the feeler 35 and the latter must then be carried along with the tire and held in an off-normal position, as shown in dotted lines in Fig. 4, with consequent closure of the spider and stationary contacts 26 and 22 as a result of the camming interaction of the stationary and movable cam elements 24, 25, such contact closure causing illumination of the dashboard lamp 45 and sounding of the buzzer 49.

As shown particularly in Figs. 5 and 8, the shorter section 32 of the feeler-arm means is held for vertical adjustment in the hub 30 by set screw 30A, while the longer feeler arm 35 is adjustable in a horizontal sense by positioning of its horizontal arm portion 35A (Fig. 5) in the coupling 33 and held in the desired position by the set screw 33A in the coupling, it being noted that the coupling 33 is itself vertically adjustable on the short feeler arm section 32 by means of another set screw 33B in the coupling (Fig. 4).

The aforesaid contact-closing motion of the spider 26 is compound, being both axial and rotary, so that the contact presser on pin 22 is a wiping pressure without danger of damage to the moving contact from the axial component, which of course continues somewhat after contact with the pin is first established.

The presser spring means 27, 28 is also of importance in that it is rotatable with the spider and cam means owing to the provision of a stop in the form of a washer 29X at the spindle end of the stub shaft which spaces the outside face of the spring-seating boss or bell plate 28 from the base 18 of the housing because the washer is spaced inwardly away from the foot of the shaft next to the spindle 29A. Therefore, the boss plate 28, spring 27, and the spider 26 all rotate together and all drag from any presser means is eliminated.

I claim:

1. In a tire alarm system, switch means including a housing adapted for attachment to a brake member appertaining to a wheel and tire thereon; a shaft rotatably mounted in said housing; a tire-engaging feeler arm extending from said shaft into proximity with the sidewall of said tire to be engaged by the latter when the tire bulges by deflation a predetermined amount; a first cam held stationary by said housing; a second cam axially slideable on said shaft and rotatable with the latter, said second cam being displaced axially in reaction with said first cam responsive to turning of said shaft; yieldable contact means moved by axial displacement, at least, of said second cam; and stationary contact means engaged by said yieldable contact means in one particular axial direction of movement thereof; spring means acting to displace said yieldable contact means, and said second cam, oppositely to said particular direction; together with signal means operably controlled by engagement and disengagement of said contact means.

2. In a torsion type switch, improvements comprising: a stationary contact, shaft means adjacent said contact, a thin movable circular contact wafer disposed concentrically of said shaft means, coacting profile cam means on the shaft means and movable contact and acting to impart linear and rotative movement to the movable contact relative to the stationary contact for circuit-closing and opening cooperation with the latter responsive to rotative motion of the shaft means, and spring means acting upon said movable contact normally urging the latter and the appertaining cam means in a direction away from the stationary contact and toward said shaft means and its appertaining cam means.

3. In an automobile tire alarm system, a deflation-sensing switch comprising a feeler arm adapted to be engaged by an under-inflated tire wall, a shaft and means operatively interconnecting same with said feeler arm to be rotatively displaced by the latter, a stationary contact and a movable contact both adapted to be connected in an alarm circuit, said movable contact being of annular and yieldable character mounted concentrically of said shaft with a peripheral region adjacent said stationary contact for engagement with the latter responsive to displacement in an axial direction, first cam transversed by said shaft, a second cam concentrically mounted in alignment with the first cam and operatively connected with said movable contact; said second cam being axially and rotatively displaced by rotative motion of the shaft a certain amount to urge the movable contact into operative engagement with the stationary contact; spring means normally urging said second cam and movable contact axially toward said first cam with the movable contact in open-circuit relation to the stationary contact; and means for mounting said shaft, cams, contacts, and spring means in cooperative assembly on a wheel structure.

4. In a torsion type switch, a housing shell having a shaft hole with a marginal keying formation, a first cam member having a complementary keying formation fitting into said hole to seat the cam and prevent the same from turning; a stub shaft passing through said cam; a second cam slidably keyed on said shaft and cooperable with the first cam to be shifted axially responsive to turning of said shaft; spring means normally urging the second cam toward the first cam to a normal position; a stationary contact in said housing, and a yieldable contact of circular character carried by said second cam and movable by the latter in an axial as well as an angular motion into and out of engagement with the stationary contact.

5. In a tire alarm switch, a support adapted for attachment to a wheel having a pneumatic tire thereon, a shaft carried by said support, a tire-bulge feeler having connection with said shaft to turn the latter when said wheel turns and a tire bulge exists in said tire thereon; a stationary alarm contact carried by said support, a movable alarm contact engageable with said stationary contact, and contact-actuating means for the movable contact including a spring and cam means operatively associated with said movable contact and shaft and acting both angularly about and axially along said shaft responsive to turning thereof by said feeler to produce corresponding angular and linear displacement of the movable contact into and out of circuit engagement with the stationary contact, said spring acting to produce the reverse displacement of the movable contact produced by turning of the shaft as aforesaid, and normally disposing said movable contact in open-circuit relation to the stationary contact.

References Cited in the file of this patent

UNITED STATES PATENTS

| | | |
|---|---|---|
| 1,857,551 | Jones | May 10, 1932 |
| 2,317,509 | Anderson | Apr. 27, 1943 |
| 2,518,065 | Reilley et al. | Aug. 8, 1950 |
| 2,659,781 | Anderson | Nov. 17, 1953 |
| 2,683,196 | Hunter | July 6, 1954 |